United States Patent [19]

Smith

[11] Patent Number: 4,519,653
[45] Date of Patent: May 28, 1985

[54] ANTI-THEFT LOCK DEVICE

[75] Inventor: Paul B. Smith, Ann Arbor, Mich.

[73] Assignee: Davco Manufacturing Corporation, Ann Arbor, Mich.

[21] Appl. No.: 421,991

[22] Filed: Sep. 23, 1982

[51] Int. Cl.³ ................. B60T 17/16; B60R 25/08
[52] U.S. Cl. ............................. 303/89; 188/265; 188/353
[58] Field of Search ............... 303/89, 71, 18–19, 303/50, 56; 188/265, 170, 353, 171, 67; 180/271, 272, 279; 92/27, 28, 24, 25; 91/41, 42, 43, 44, 45; 307/10 AT; 192/4 A, 3 H

[56] References Cited

U.S. PATENT DOCUMENTS 2,751,054 6/1956 Del Re, Sr. ....................... 188/265
3,874,747 4/1975 Case et al. ........................ 303/89
3,998,495 12/1976 Maxwell et al. ................... 303/89

FOREIGN PATENT DOCUMENTS 1295459 4/1961 France ............................ 188/265

Primary Examiner—Douglas C. Butler
Attorney, Agent, or Firm—Harness, Dickey & Pierce

[57] ABSTRACT

An anti-theft device, having application for preventing unauthorized operation of a vehicle, includes a moveable lock member biased toward the actuating member for the vehicle's parking brakes. An electric solenoid is energized along with the ignition system to retract the lock member and allow the parking brakes to be released. The preferred device also includes a timer apparatus that requires the parking brakes to be released according to a predetermined timing sequence in order to substantially prevent theft of the vehicle.

8 Claims, 5 Drawing Figures

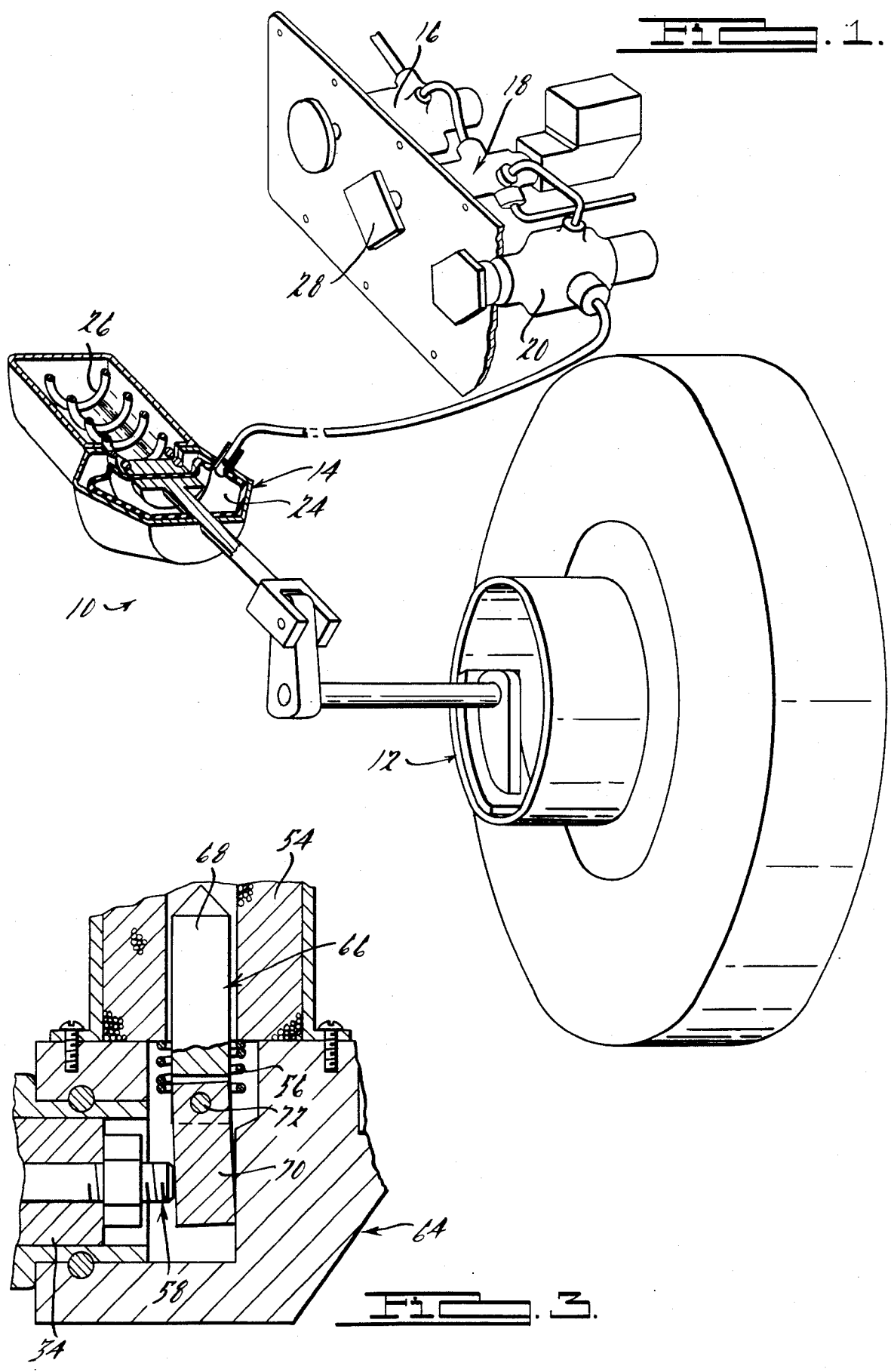

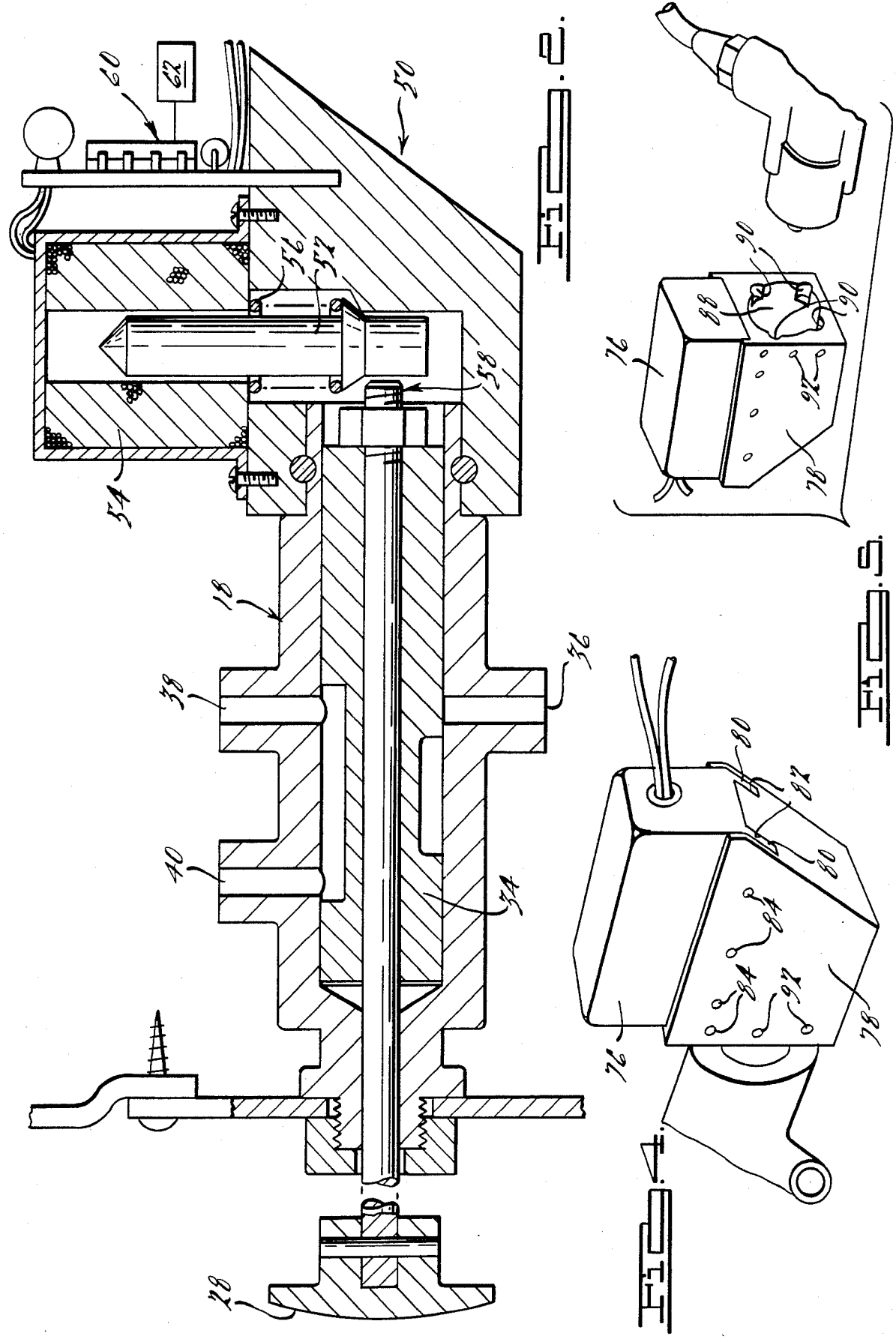

ANTI-THEFT LOCK DEVICE

BACKGROUND AND SUMMARY OF THE INVENTION

The invention relates generally to locking devices that prevent unauthorized actuation of a system in which the device is included, and more particularly to locking devices that prevent unauthorized release of the brakes on a vehicle.

The prevention of theft of expensive equipment, such as heavy trucks or semi-tractors, has spawned the development of various anti-theft devices for such equipment. Such prior devices have proved to be inordinately difficult and cumbersome to use or largely ineffective in preventing the defeat of the system by a thief. In addition, many of such prior anti-theft systems are designed to interrupt either the braking system or the electrical system in such a way that could result in a dangerous situation in the event of failure of the anti-theft device while the vehicle was operating. Therefore, the need has arisen for a substantially effective anti-theft system for vehicles that will cause no danger to the vehicle or its operator in the event of failure of any of its components.

In accordance with the invention, an anti-theft device for a vehicle includes a moveable lock member biased into interfering engagement with a brake actuating member when the actuating member is moved to a brake-applied position. The lock member thereby prevents release of the brakes until a selectively operable release system is activated in response to operation of the keyed switch for the ignition system. Preferably, the anti-theft device also includes a timer circuit which de-activates the release system, thereby preventing the vehicle from being moved, if the brakes are not released within a predetermined time period. The timer apparatus may also prevent the release system from being activated more than a given number of times within a second predetermined time period and may also include means for reprogramming the timing sequence of operation of the anti-theft device or the durations of the first and second time periods. The anti-theft device and the timer apparatus are housed in a substantially tamper-proof housing which is preferably hidden from view and not easily accessible to a potential thief.

The invention may also include an alarm system which would be activated in the event of improper operation of the anti-theft device, thereby indicating an attempted unauthorized operation of the vehicle.

BRIEF DESCRIPTION OF THE DRAWINGS

FIG. 1 is a schematic representation of an exemplary vehicle air brake system including the anti-theft device of the present invention.

FIG. 2 is a longitudinal cross-sectional view of an air valve in the air brake system of FIG. 1, with the anti-theft device of the present invention installed thereon.

FIG. 3 is a partial cross-sectional view, illustrating an alternate embodiment of the anti-theft device.

FIG. 4 is an overall perspective view of the anti-theft device of the present invention installed on a air valve, illustrating the tamper-proof housing.

FIG. 5 is a view illustrating the installation of the anti-theft device on an air valve.

DETAILED DESCRIPTION OF THE PREFERRED EMBODIMENTS

FIGS. 1 through 5 of the drawings depict exemplary embodiments of the present invention for purposes of illustration only. One skilled in the art will readily recognized from the following discussion that the principles of the invention are equally applicable to other anti-theft devices and to systems other than air brake systems as shown in the drawings.

In FIG. 1, an exemplary air brake system 10 for a semi-tractor and trailer vehicle is schematically represented. The air brake system 10 includes a vehicle brake 12 and an air brake actuator mechanism 14. A typical series of standard air valves operable from the interior of the semi-trailer cab includes tractor brake control valve 16, parking brake control valve 18 and trailer brake control valve 20. The brake actuator mechanism 14 includes a diaphragm member 24 and a return spring 26. When the operator pulls the parking brake control knob 28 outwardly, the parking brake control valve 18 vents air from inside the diaphragm member 24, and the return spring 26 causes the brake actuator mechanism 14 to apply the brake 12 to prevent the vehicle from being moved. When the parking brake control knob 28 is pushed inwardly, the parking brake control valve admits pressurized air to the diaphragm member 24, thus overcoming the force of the return spring 26 and releasing the brake 12.

As illustrated in FIG. 2, the parking brake control valve 18 includes a valve actuating member 34 which is connected to the parking brake control knob 28 between a brake-applied position and a brake-released position. In its brake-applied position, shown in FIG. 2, the valve actuating member 34 blocks entry of pressurized air through the air supply port 36 and opens communication between the brake line port 38 and the air vent port 40, thereby depressurizing the brake actuator mechanism 14 and allowing the return spring 26 to apply the brake 12 in FIG. 1. When the valve actuator member 34 is moved inwardly toward the valve body, the air vent port 40 is blocked and fluid communication is established between the air supply port 36 and the brake line port 38.

FIG. 2 also illustrates the preferred anti-theft device 50 which includes a lock member 52, a solenoid 54, and a biasing spring 56 resiliently biasing the lock member 52 toward the valve actuating member 34. When the solenoid 54 is energized, however, the force of the biasing spring 56 is overcome, and the lock member 52 is urged away from the valve actuating member 34. Thus, when the valve actuating member 34 is moved outwardly to apply the parking brakes, as shown in FIG. 2, the lock member 52 is moved into an interferring engagement with the inner end 58 of the actuating member, thus preventing release of the parking brake. Once the solenoid 54 is energized, however, the lock member 52 is pulled away from the valve actuating member 34, thereby allowing the parking brakes to be released. When the valve actuating member 34 is in its inward, brake-released position, the lock member slidably engages the actuating member in a non-interferring relationship. It should also be noted that the lock member 52 may be adapted to interferringly engage portions of a valve actuating member other than the inner end, such as, for example, an annular groove near the end of a valve actuating member that is so equipped. Other such variations on the lock member to suit specific actuating members will readily occur to one skilled in the art.

The anti-theft device 50 includes a controller apparatus 60, which may be an electric or electronic device energized when the key switch of the vehicle's ignition system 62 (shown schematically in FIG. 2) is moved to its "on" position. The controller apparatus 60 may include circuitry for providing any of several control functions. For example, a timer circuit may be included which energizes the solenoid 54 to hold the lock member 52 out of engagement with the actuating member 34 only for the predetermined time period after the key switch is turned on. Therefore, if the valve actuating member 34 is not pushed inwardly to release the parking brakes within such predetermined time period, the solenoid 54 is de-energized and the lock member 52 is biased back into its interfering relationship with the actuating member. The controller apparatus 60 may also include timer circuitry which prevents the solenoid 54 from being energized more than a predetermined number of times within a given time period. The circuitry may optionally be capable of being reprogrammed by the operator to vary the durations of the various time periods. Audible or visual alarms may be incorporated into the controller apparatus 60 for indicating an attempted unauthorized operation of the vehicle. The electric or electronic circuitry involved in providing the controller apparatus with these or other functions are well-known to those skilled in the art.

FIG. 3 illustrates an alternate embodiment 64 of the anti-theft device which is similar to the anti-theft device 50 shown in FIG. 2, but which includes an alternate lock member 66. The lock member 66 includes an upper portion 68 having a bifurcated end for receiving the tongue-shaped end of a lower portion 70. The upper and lower portions of the alternate lock member 66 are pivotally connected by means of a hinge pin 72. In other respects, the alternate anti-theft device 64 is similar to the anti-theft device 50 shown in FIG. 1.

FIGS. 4 and 5 illustrate the installation of a substantially tamper-proof housing 76 and body 78 of the anti-theft device to the parking brake control valve 18. The tamper-proof housing 76, which functions as a security cover for the solenoid 54 and the controller apparatus 60, is preferably composed of a heavy gauge metal. The housing is held in place by tangs 80 which are received in slots 82 in the body 78. A number of pins 84 are driven or pressed into a press-fit engagement with the body 78 and the tangs 80 to secure the housing and body together, thereby necessitating the use of special tools to disassemble the anti-theft device.

As shown in FIG. 5, the body 78 of the anti-theft device may also be secured to the parking brake control valve 18 in a manner making it difficult for a thief to readily disassemble the unit. The body 78 is provided with an opening 88 having a number of slots or recesses 90 that correspond with ridges or other protrusions on the body of the parking brake control valve. Pins 92 are pressed or driven into a press-fit engagement with the body 78 and the body of the parking brake control valve 18 to provide a substantially tamper-proof connection therebetween.

The anti-theft device of the present invention is operated by first switching the vehicle ignition key to the "on" position in order to simultaneously energize the solenoid 54 and begin the first timing sequence of the controller apparatus 60. After the engine has run for a sufficient time to allow the vehicle's air compressor to develop enough air pressure to operate the air brake system, the ignition switch is rapidly turned to the "off" position and returned to the "on" position in order to initiate the second timing sequence of the controller apparatus 60. The operation of quickly turning the ignition off and on, if done rapidly, will not cause the vehicle's engine to stall. Finally, the parking brake control knob 28 is pushed inwardly to release the parking brakes before the expiration of the second timing sequence. Subsequent application of the parking brakes after the vehicle has been stopped is accomplished merely by pulling the parking brake control knob outwardly, thus requiring no special action on the part of the operator.

The foregoing discussion and the accompanying drawings disclose and describe merely exemplary embodiments of the present invention. One skilled in the art will readily recognize from such discussion that various changes, modifications and variations may be made therein without departing from the spirit and scope of the invention as defined in the following claims.

What is claimed is:

1. In an apparatus having an actuating member moveable between an actuating position and a de-actuating position, the improvement comprising a lock member moveable toward and away from said actuating member, biasing means for biasing said lock member toward said actuating member, said lock member non-interferringly engaging said actuating member when said actuating member is in its de-actuating position and interferringly engaging said actuating member when said actuating member is in its actuating position to prevent said actuating member from being moved to said de-actuating position, selectively energizable electric solenoid means for moving said lock member out of engagement with said actuating member to allow said actuating member to be moved from said actuating position to said de-actuating position and timing means for energizing said electric solenoid means for a predetermined time period after said electric solenoid means is initially energized in order to hold said lock member out of engagement with said actuating member for said predetermined time period, thereby allowing said actuating member to be moved from said actuating position to said de-actuating position during said predetermined time period.

2. The improvement according to claim 1, further comprising a body, housing means for enclosing said lock member, said biasing means, said electric solenoid means and said timing means, and further comprising pin means forcibly pressed into a press-fit engagement with said body and said housing means.

3. In a fluid-actuated vehicle brake system for a vehicle having an ignition system, the brake system having brake means and a valve for supplying fluid to said brake means, said valve including a valve actuating member slidably moveable between a brake-applied position and a brake-released position, the improvement comprising a lock member biased into a non-interferring engagement with said actuating member when said actuating member is in its brake-released position to allow movement of the actuating member, said lock member also being biased into an interferring engagement with said actuating member when said actuating member is in its brake-applied position, an electric solenoid for selectively urging said lock member away from said actuating member to allow free movement thereof when said solenoid is energized, said solenoid being energized in response to energization of the ignition system of said vehicle, control means for de-energizing said solenoid at the end of a predetermined time period after said energization of the ignition system.

4. The improvement according to claim 3, further comprising a body and a security cover for enclosing said lock member, said solenoid and said control means, said body and security cover being secured together by pins forcibly pressed into a press-fit engagement therebetween, and said body also being secured to said valve by pins forcibly pressed into a press-fit engagement therebetween.

5. The improvement according to claim 4, wherein said timing means includes means for preventing said electric solenoid means from being energized more than a predetermined number of times within a second predetermined time period after the solenoid means has been energized.

6. The improvement according to claim 5, wherein said timing means includes means for programming the respective durations of said first and second time periods.

7. The improvement according to claim 6, further comprising a body, housing means for enclosing the lock member, the resilient biasing means, the electric solenoid means and the timing means, said housing including closure means for substantially preventing unauthorized opening of said housing means.

8. The improvement according to claim 7, wherein said closure means includes a number of pin members forcibly pressed into a press-fit engagement with said body and said housing means.

* * * * *